(12) United States Patent
Fleming et al.

(10) Patent No.: US 8,321,958 B1
(45) Date of Patent: Nov. 27, 2012

(54) DETECTING PRESENCE OF A SUBJECT STRING IN A TARGET STRING AND SECURITY EVENT QUALIFICATION BASED ON PRIOR BEHAVIOR BY AN END USER OF A COMPUTER SYSTEM

(75) Inventors: Samuel Fleming, Spokane, WA (US); Richard T. Weeks, Spokane, WA (US)

(73) Assignee: Next IT Corporation, Spokane, WA (US)

( * ) Notice: Subject to any disclaimer, the term of this patent is extended or adjusted under 35 U.S.C. 154(b) by 539 days.

(21) Appl. No.: 12/511,307

(22) Filed: Jul. 29, 2009

Related U.S. Application Data

(60) Provisional application No. 61/084,638, filed on Jul. 30, 2008.

(51) Int. Cl.
  *G06F 7/04* (2006.01)
  *G06F 17/30* (2006.01)
  *H04N 7/16* (2011.01)
(52) U.S. Cl. .............. 726/29; 726/27; 726/2; 340/5.8; 340/5.81; 340/5.82; 340/5.83; 340/5.84; 340/5.85; 340/5.86; 705/18
(58) Field of Classification Search ............. 726/29
  See application file for complete search history.

(56) References Cited

U.S. PATENT DOCUMENTS

| | | |
|---|---|---|
| 6,922,669 B2 | 7/2005 | Schalk et al. |
| 7,200,576 B2 | 4/2007 | Steeves et al. |
| 2005/0209853 A1 | 9/2005 | Davis et al. |
| 2009/0171955 A1 | 7/2009 | Merz et al. |

FOREIGN PATENT DOCUMENTS

JP  2006185167 A  *  7/2006

OTHER PUBLICATIONS

LingPipe String Comparison Tutorial (Jul. 16, 2012), Retrieved online Jul. 16, 2012.*

(Continued)

*Primary Examiner* — James A Reagan
(74) *Attorney, Agent, or Firm* — Lee & Hayes, PLLC

(57) ABSTRACT

A software-based security agent that hooks into the operating system of a computer device in order to continuously audit the behavior and conduct of the end user of the computer device. The detected actions of the end user can be stored in a queue or log file that can be continuously monitored to detect patterns of behavior that may constitute a policy violation and/or security risk. When a pattern of behavior that may constitute a policy violation and/or security risk is detected, an event may be triggered. A frequency vector string matching algorithm also is disclosed. The frequency vector string matching algorithm may be used to detect the presence or partial presence of subject strings within a target string of alphanumeric characters. The frequency vector string matching algorithm could be used to detect typos in stored computer records or to search for records based on partial information. In addition, the frequency vector string matching algorithm could be used to search communications for sensitive information that has been manipulated, obscured, or partially elided. In addition, an anomaly analysis is disclosed for comparing behavior patterns of one user against the behavior patterns of other users to detect anomalous behaviors.

6 Claims, 4 Drawing Sheets

OTHER PUBLICATIONS

Burgess, "Probabilistic Anomaly Detection in Distributed Computer Networks," Oslo University College, Oslo, Norway, Preprint submitted to Science of Computer Programming, Jun. 8, 2005, 32 pages.

Lane, "Machine Learning Techniques for the Domain of Anomaly Detection for Computer Security," Purdue University, Department of Electrical and Computer Engineering and the COAST Laboratory, Jul. 16, 1998, 80 pages.

Maxion, et al. "Benchmarking Anomaly-Based Detection Systems," Department of Computer Science, Carnegie Mellon University, 2000 IEEE, 1st International Conference on Dependable Systems & Networks: New York, New York, USA, Jun. 25-28, 2000, pp. 623-630.

* cited by examiner

DETECTING PRESENCE OF A SUBJECT STRING IN A TARGET STRING AND SECURITY EVENT QUALIFICATION BASED ON PRIOR BEHAVIOR BY AN END USER OF A COMPUTER SYSTEM

PRIORITY CLAIM

This application claims priority to U.S. provisional application Ser. No. 61/084,638, filed 30 Jul. 2008, entitled "Security Event Qualification Based on Prior Behavior by an End User of a Computer System," which is incorporated herein by referenced in its entirety.

BACKGROUND

There are in general two current security approaches for enterprise-level IT systems. One approach is to monitor network activity, such as whether inappropriate files (such as files with sensitive information) are being transmitted to a non-secure network. Another approach is to limit the entitlements of users of an enterprise IT system, usually based on the users' profiles. For example, certain users may be restricted from accessing certain files on the network. Both of these approaches have their drawbacks. Because the network approach focuses on network activity, it often misses non-network related activity, such as printing or copying sensitive data to a portable storage device, that may still constitute a security risk. The entitlements-based client-side approach misses potentially malicious conduct that an end user could perform with data that the end user is entitled to access.

SUMMARY

In one general aspect, the present invention is directed to a software-based security agent that hooks into the operating system of a computer device in order to continuously audit the behavior and conduct of the end user of the computer device. The detected actions of the end user can be stored in a queue or log file that can be continuously monitored to detect patterns of behavior that may constitute a policy violation and/or security risk. When a pattern of behavior that may constitute a policy violation and/or security risk is detected, an event may be triggered.

In another general aspect, a computer-implemented frequency vector string matching algorithm is disclosed. The frequency vector string matching algorithm may be used to detect the presence or partial presence of subject strings within a target string of alphanumeric characters. The frequency vector string matching algorithm could be used to detect typos in stored computer records or to search for records based on partial information. In addition, the frequency vector string matching algorithm could be used to search communications for sensitive information that has been manipulated, obscured, or partially elided.

In addition, a computer-based anomaly analysis is disclosed for comparing behavior patterns of one user against the collective behavior pattern of other users to detect anomalous behaviors.

FIGURES

Various embodiments of the present invention are described herein by way of example in conjunction with the following figures, wherein.

DETAILED DESCRIPTION

In one general aspect, the present invention is directed to a software-based security agent that hooks into the operating system of a computer device in order to continuously audit the behavior and conduct of the end user of the computer device. The detected actions of the end user can be stored in a queue or log file that can be continuously monitored to detect patterns of behavior that may pose or constitute a policy violation or security risk. When a pattern of behavior that may pose or constitute a policy violation or security risk is detected, an event may be triggered. Examples of possible events are described further below.

Figure 1:
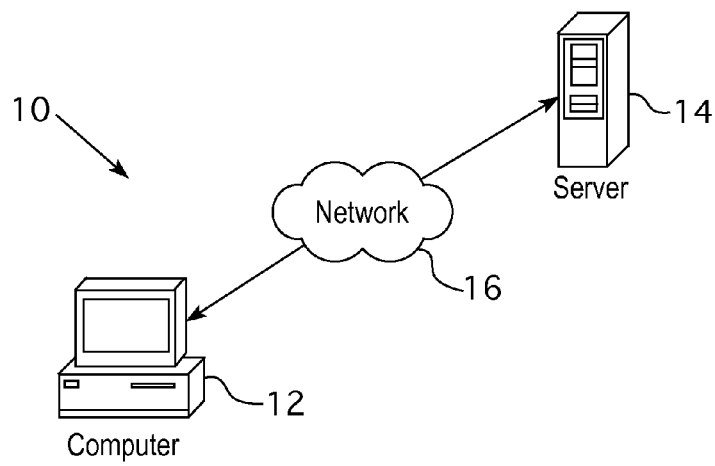
FIG. 1 is a diagram of a computer network according to various embodiments of the present invention.

FIG. 1 illustrates a simplified computer network 10 in which a computer device 12 is in communication with a network server 14 via a network 16. The computer device 12 may be, for example, a desktop PC, a laptop computer, a workstation, or any other suitable computer device that is used by an end user. Although there is only one network server 14 shown in FIG. 1, it should be recognized that the IT network 10 may have numerous network servers for providing various network functions. Among other things, the network server 14 may be used to authenticate an end user when he/she logs onto the network 10. In addition, the network server 14 may push network policies to the computer device 12 and configure the computer device 12. The network policies may identify, among other things, patterns of conducts that are to be monitored by the security agent, the confidence or threshold levels to be used by the security agent in evaluating the patterns of behavior, and the types of events to be triggered when various patterns are detected for example. The network 16 may be a LAN, WAN, MAN, or any other suitable electronic data communications or computer network with wired and/or wireless communication links. In addition, a number of computer devices 12 could be in communication with the network servers 14 via the network 16, although only one is shown in FIG. 1 for simplicity.

Figure 2:
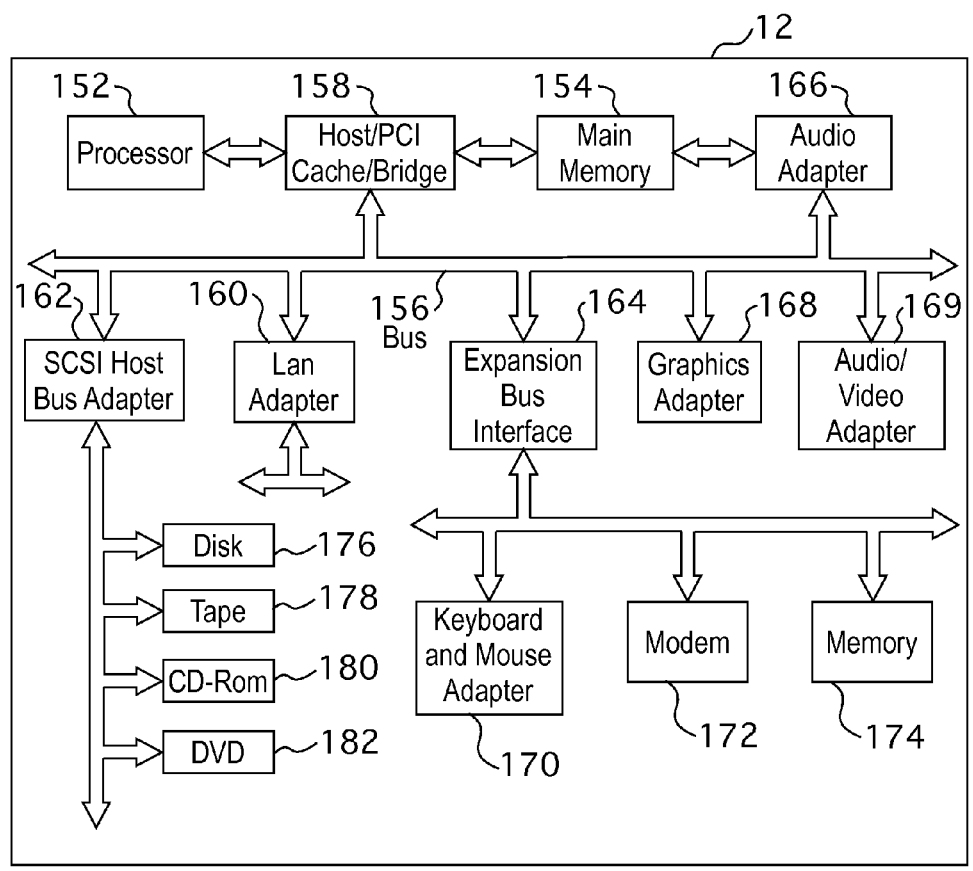
FIG. 2 is a simplified, block diagram of a computer device according to various embodiments of the present invention.

FIG. 2 is a simplified block diagram of the computer device 12 according to various embodiments. In this example, the computer device 12 employs a peripheral component interconnect (PCI) local bus architecture, although the present invention is not so limited and other bus architectures could be used. As shown in FIG. 2, the computer device 12 comprises a processor 152 and a main memory 154 connected to the PCI local bus 156 through a PCI bridge 158. The processor 152 may be implemented as a semiconductor integrated circuit (IC). Also, although only one processor 152 is shown in the embodiment of FIG. 2, the computer device 12 may comprise multiple processors. The PCI bridge 158 may also include an integrated memory controller and cache memory for the processor 152. In the illustrated embodiment, a LAN adapter 160, a SCSI host bus adapter 162, and an expansion bus interface 164 are connected to the PCI local bus 156. A graphic adapter 168 and audio/video adapter 169 may also be connected to the local bus 156. The expansion bus interface 164 provides a connection for a keyboard and mouse adapter 170, a modem 172, and an additional memory 174. A keyboard and mouse for the computer device 12 may be connected via the adapter 170. The SCSI host bus adapter 162 provides a connection for a hard disk drive 176, a tap drive 178, a CD-ROM 180, and a DVD drive 182.

The main memory 154 may comprise primary memory for the computer device 12, such as a random access memory (RAM) and a read only memory (ROM). The RAM and ROM may be implemented in various embodiments as separate semiconductor ICs. The ROM may store basic programs for a bootstrap of the computer device 12. Instructions for the operating system and software applications may be stored on secondary storage devices, such as the hard disk drive 176 and loaded into the RAM for execution by the processor 152.

Figure 3:
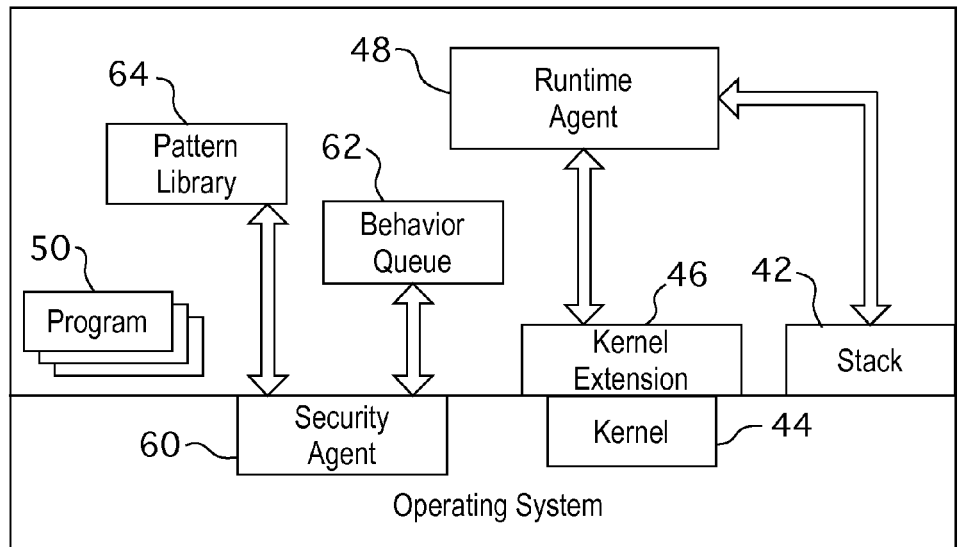
FIG. 3 is a simplified, block diagram of modules of the main memory of the computer device of FIG. 2 according to various embodiments of the present invention.

FIG. 3 is a simplified, partial block diagram of the RAM of the main memory 154 according to various embodiments of the present invention. The RAM includes an operating system (OS) 40, which provides a software platform for the computer device 12. The OS 40 may be executed by the processor 152 and may be, for example, a Microsoft Windows-based OS, Mac OS X-based OS, a Linux-based OS, or a Solaris-based OS. A stack 42 processes a set of protocol layers working together for defining network communications (such as communications with the network servers 14). The OS 40 may also include a kernel 44, which provides essential services required by other parts of the OS 40. A kernel extension module 46 adds functionality to the OS 40, using publicly available, standard interfaces, for example. A runtime agent 48 controls execution of the application programs 50 on the computer device 12. The runtime agent 48 may interface with the stack 42 in order to exchange information with other devices on the network. The runtime agent 48 may also control several memory structures, which are not shown in FIG. 3 for the sake of simplicity.

As shown in FIG. 3, the RAM also includes a security agent 60 that has hooks into the OS 40. The security agent 60 continuously audits certain of the user's interactions with the computer device 12 (e.g., the activities of interest), including key strokes from the keyboard, mouse commands from the mouse, installation of and interactions with hardware devices, opening and closing of software applications, etc. User interaction data captured by the security agent 60 that is indicative of the user's interactions with the computer device 12 may be stored in a behavior queue or log 62, which may be part of the RAM. The security agent 60 also monitors the queue or log 62 of interactions to detect patterns of behavior that are sufficiently similar to previously established behaviors indicative of actions on the part of the user that constitute a potential security event or breach. The security agent 60 may compute a confidence score that a detected behavior pattern is one of the previously established patterns. If the confidence score is above a pre-established threshold level, the security agent 60 may trigger a response by the computer device 12 based on the detected pattern of activity. The types of responses by the computer device 12 may range, for example, from a simple logging of the detected behavior pattern so that it can be communicated to a network administrator, to a pop-up window display asking the user to confirm that he/she is entitled to take the action that caused the trigger to fire, to preventing the user from taking the action that caused the trigger to fire. Other responses may also be employed and are within the scope of the invention. The previously established patterns of behavior against which the user interaction data is compared may be stored in the pattern library 74 of the RAM.

Figure 4:
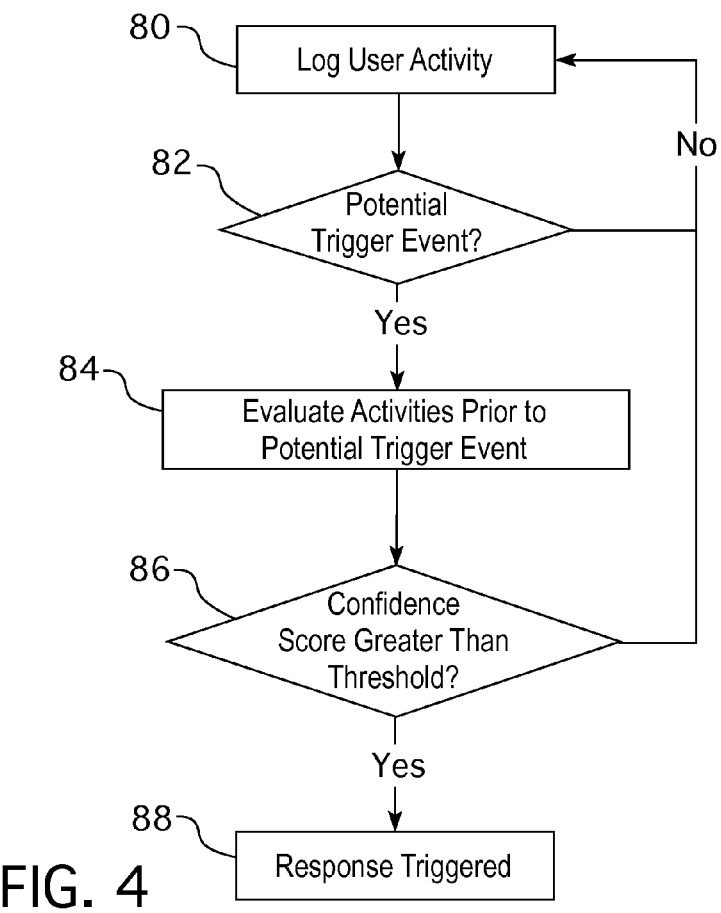
FIG. 4 is a diagram of a process flow of the security agent according to various embodiments of the present invention.

FIG. 4 is a diagram of the process flow of the security agent 60 when executed by the processor 152 according to various embodiments of the present invention. At step 80, the security agent 60 logs in the behavior queue 62 actions detected by the user vis-à-vis the computer device 12. The actions may include access to local or network software applications, access to network files or databases, file activity (e.g., copying or deleting files), keyboard inputs, mouse clicks or commands, screen captures, clipboard activity, web browsing, command lines, application focus, etc. The types of interactions that are captured and stored in the queue 62 may be determined based on the configuration parameters for the computer device 12. Updated configuration parameters may be pushed to the computer device 12 from the network server(s) 14 upon logging on to the network 10. Any type of activity deemed interesting may be stored in the queue 62.

At block 82, the security agent determines whether the detected user activity is a potential trigger event. Potential trigger events may be events that are determined to be events that are likely to occur in a security breach, such as printing, sending an email or instant message, CD burning, copying to a portable storage device (e.g., a thumb drive), etc. If a potential trigger event is detected, the process advances to step 84, where the security agent evaluates recent user activity stored in the queue 62 to determine if any patterns of activity match one of the patterns stored in the library 64. The library 64 may be a collection of ordered and/or unordered lists of activities previously supplied to the computer device 12 as part of the configuration process. According to various embodiments, the security agent 12 may compute confidence scores in matching the detected patterns of behavior to the patterns stored in the library 64. If, at block 86, the confidence score is above the threshold level for a particular pattern, the process advances to block 88, where the response is triggered. This process allows the security agent 60 to qualify the degree of risk and level of certainty that a given pattern of activity by the end user in the desktop computing environment is a policy violation or security risk by examining the user's prior behavior up to the point that a potential trigger event is detected.

The security agent 60 could be used to detect many different types of policy violations and/or security risks. As an example, suppose a user accesses a core program of the network, copies sensitive data from the core program, and then pastes that data email into an email or instant message. When the security agent 60 detects the potential trigger event, such as the sending of the email or the instant message, the security agent 60 can then review the prior actions by the user stored in the queue 64 and detect (i) that the user accessed the core program, (ii) copied data from the program, and (iii) pasted the copied data into the email or instant message. If this pattern sufficiently matches a pattern of behavior in the library 66, the security agent 60 can fire a response. The responses may range, for example, from logging the behavior in the queue 62 for reporting to a network administrator, to sending a message to the user asking if the email or instant message contains sensitive data that should not be transmitted via email or instant messaging, to preventing the user from sending the email or instant message, or any other response that is suitable for the detected behavior. Similarly, the security agent 60 could detect the user's attempts to copy the copied data into file and then printing the file or copying it to a portable storage device, for example.

As an another example, suppose an end user goes to an online shopping site and enters a credit card number to make a purchase. In most existing security applications, this activity does not result in an event because many users may perform this activity with their own credit card information. With the embodiments of the present invention, however, the security agent 60 can detect the entering of the credit card information on the web site as a potential trigger event. It can then evaluate prior user activity to determine if this activity constitutes a policy violation or security breach. For example, if the end user was an employee of a bank and if prior to typing in the credit card information on the online shopping website, the user accessed a network file containing credit card information for customers of the bank, this pattern of activity may be sufficient to trigger a response, depending on the threshold level for the pattern matching.

Figure 5:
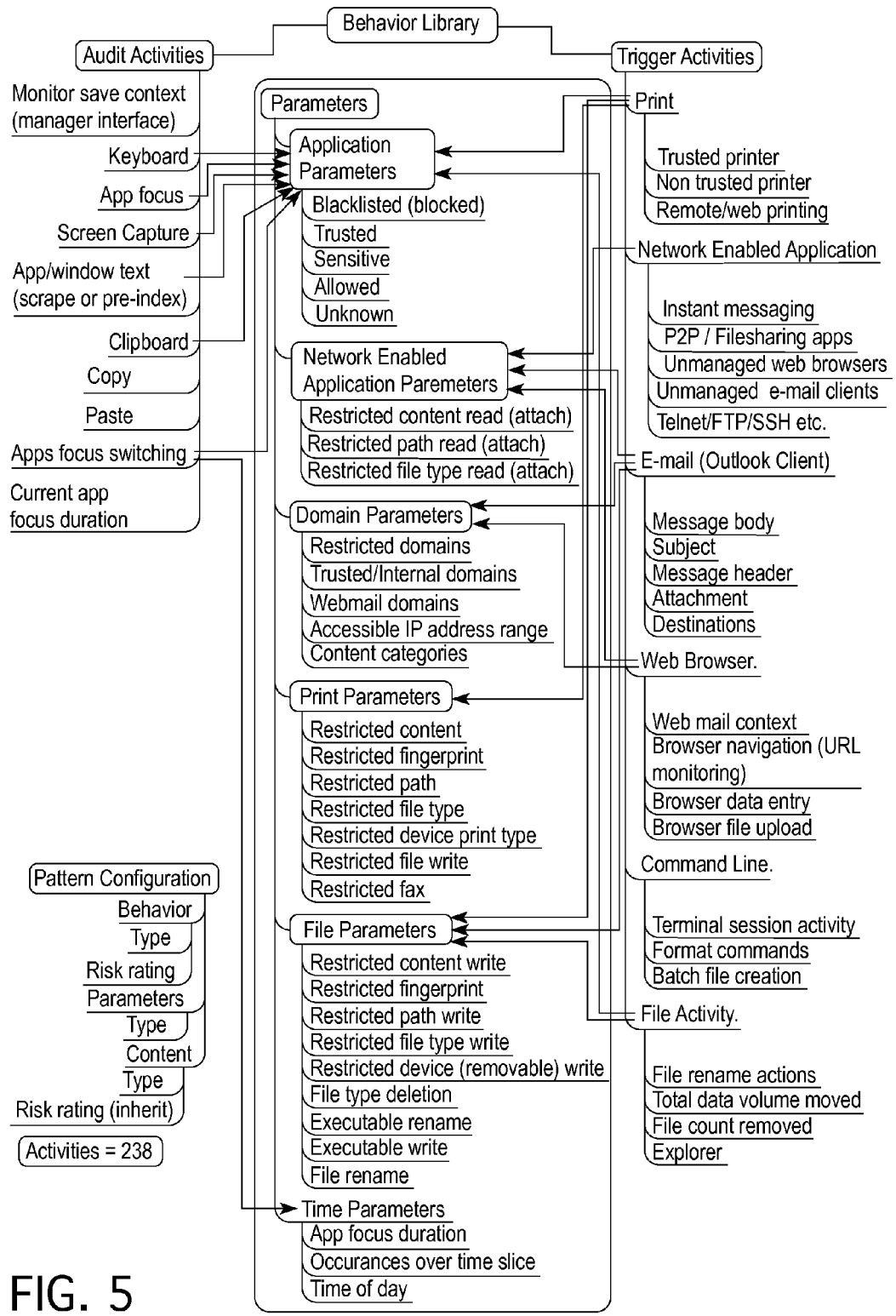
FIG. 5 is a chart showing the relationship between trigger activities, parameters, and audit activities according to various embodiments of the present invention.

There may be a number of potential trigger events. The prior activity that gives rises to a potential pattern match may depend on parameters related to the type of trigger event. FIG. 5 is a chart showing the relationship between the various types of trigger activities (on the right-hand side), the types of parameters to be evaluated (on the middle of the chart), and the types of activities that are audited (on the left-hand side). FIG. 5 show that in this example, the potential trigger events may include various printing behaviors, such as printing to a trusted printer, a non-trusted printer, remote or web printing, etc. For printing behaviors, the security agent 60 may evaluate, for example, application parameters, printing parameters, and/or file parameters in evaluating the user's prior behavior. The activities that are audited for the application parameters may include keyboard behaviors, application focuses, screen capture activity, application or window text activity, clipboard activity, etc. The application parameters may include parameters such as whether the user accessed a blacklisted (or blocked) application, a trusted application, a sensitive application, an allowed application, etc. The print parameters may include whether the user is attempting to print restricted content or content with a restricted fingerprint, whether the user is attempting to print via a restricted path, whether the user is attempting to print a restricted file type, etc. FIG. 5 shows the relationship between the various types of parameters and the various trigger activities. Of course, in other embodiment, different parameters and different trigger activities could be used, and there could be different relationships between the trigger activities and the parameters. In addition, the audited activities could be different.

According to various embodiments, the security agent 60 (or some other program stored in the memory 154 and executed by the processor 152) also may be able to detect the presence or partial presence of one or more subject strings in a target string of alphanumeric characters. That way, if the end user (i) copies sensitive data, (ii) manipulates the copied data, and (iii) then seeks to export the copied, manipulated data (such as by printing, email, etc.), the security agent 60 may still be able to determine a likelihood that the manipulated data is sensitive data that should not be exported.

According to various embodiments, the security agent 60 (or other program) may use a frequency vector string matching algorithm to determine the correlation between ranges of the target string and the source strings. The frequency vector string matching algorithm may search through a target string without need for the search (or source) string to appear as a proper substring within the target string. The returned value from the matching process may be a score indicating the similarity between the source pattern and the part (or substring) of the target string. The result is more useful in heuristic evaluation than a simple match/no match result. In addition to being able to search for sensitive information that has been obscured or partially elided, the frequency vector string matching algorithm can also be used to detect typos in stored computer records or search for records based on partial information. In such application, the frequency vector string matching algorithm may not be part of the security agent 60, but some other program 50 of the main memory 154.

In one embodiment, the security agent 60 may (i) correlate the frequency of occurrence of the characters specified as significant between the source strings and ranges of the target string, and then (ii) normalize the result to adjust for the similarity between the given subject (or target) strings and statistically random data. The source strings may be stored in the main memory 154 or some other memory device associated with the computer device 12. The target string may be a string entered by the user of the computer device in an application, for example.

Figure 6:
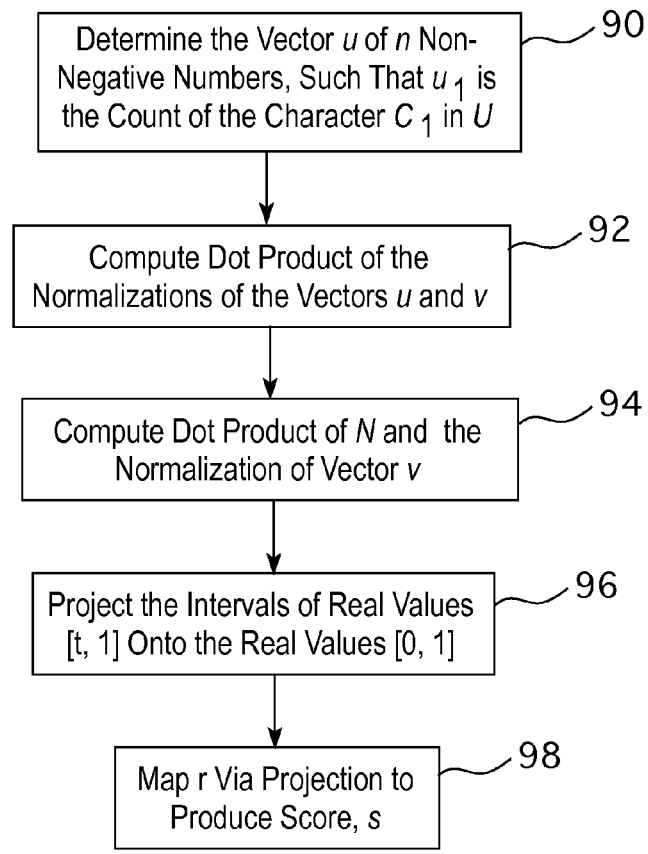
FIG. 6 is a diagram of a process flow for detecting the presence or partial presence of a subject string in a target string according to various embodiments of the present invention.

The following describes one embodiment for frequency vector string matching. Let C be an array of n values, each of which represents one unique character to be denoted $C_i$. Then let $\vec{v}$ be a vector of n non-negative numbers such that $v_i$ is the count of the character $C_i$ in the source string S. If T is the target sting of length m, and for some k, wherein $n \leq k \leq m$, the procedure to score the substring U of string T beginning at offset j ($0 \leq j \leq m-k$) and of length k is shown in FIG. 6. The procedure starts at step 90, where the vector $\vec{u}$ of n non-negative numbers, such that $u_i$ is the count of the character $C_i$ in U. Then, at step 92, the dot product of the normalizations of the vectors $\vec{u}$ and $\vec{v}$ are computed. For purposes of this discuss, this dot product is denoted r. If $\vec{N}$ is the normalization of a vector of n 1's then at step 94, the dot product of $\vec{N}$ and the normalization of $\vec{v}$ is computed. For purposes of this discussion, this dot product is denoted t. Next, at step 96, the interval of real values [t,1] is projected onto the real values [0, 1]. Next, at step 98, r is mapped via this projection to produce s, the final score for substring U. This process may be repeated for each or numerous substrings U of string T, with the highest s for any substring U from T being the score for T.

In various embodiments, the score can be used by the security agent 60 in determining whether to trigger response based on the user's interactions with the computer device 12. For example, if a user seeks to export data comprising target string T, and T, as determined by the frequency vector string matching, is sufficiently close to sensitive data comprising a source string S, a response may be triggered, as described above.

In another aspect, the network server 14 (or some other networked computer device) may be programmed to evaluate user behavior from a number of users in the network 10 to detect anomalous user behavior. This way anomalous behavior patterns can be identified, without assuming prior knowledge within the system of expected event patterns. Some of the identified anomalous behaviors can be stored in the pattern libraries 64 of the computer devices 12 to evaluate ongoing behavior of end users. In this way, the pattern libraries 64 can be tuned on an ongoing basis.

According to one embodiment, the behavior logs 62 for a number of end users at computer devices 12 are transmitted via the network 16 to the network server 14. The network server 14 may then compare the behavior of one selected user against the behavior of the entire group (or a subset thereof) of end users. Based on the comparison, a score may be computed by the network server 14 that is indicative of the difference between the selected user and his/her peers. According to various embodiments, the scoring may be nonlinear with respect to the number of users equally contributing to the data set, and can be adjusted to emphasize an optimal amount of anomaly for the given security situation. According to one embodiment, the scoring algorithm may start with a proportional contribution from each user for which behavior data are collected.

According to various embodiments, a function (denoted f) may be used to map a user's level of contribution to determining the actual level of anomaly. In one embodiment, the function f may have the following conditions:
- f(0)=0, indicating that a user who does not contribute is completely non-anomalous;
- f(1)=1, indicating that a user who contributes all of the activity is completely anomalous;
- f'(0)=0, indicating that initial small contributions to the overall level of activity raise the user's anomaly score gradually; and
- f'(1)=0, indicating that small contributions to the overall activity level by other users decrease the anomaly score of a single user contributing most of the activity only gradually.

According to various embodiments, the function f may be a polynomial function, such as function of the form $f(x)=(3x^{2k}-2x^{3k})^m$, where x is defined as the number of events attributed to the subject user divided by the total number of events detected among all users. The constants k and m depend on the desired response curve (i.e. sensitivity and fall-off rate) and may be determined experimentally for the desired result.

According to various embodiments, the anomaly analysis can include a priori information about the organizational structure for the organization to which the users belong, so that actors with typically high activity levels can be segregated from users with typically low activity levels, to thereby reveal additional anomalous behavior. The anomaly analysis can then determine which group has the most de facto significance with respect to any observed behavior and score such behavior accordingly.

Figure 7:
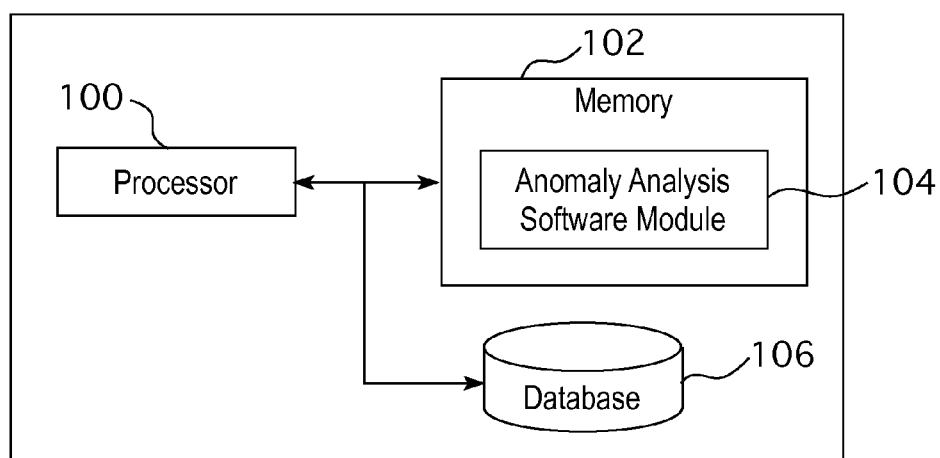
FIG. 7 is a diagram of a computer device for performing an anomaly analysis according to various embodiments of the present invention.

FIG. 7 is a simplified block diagram of a network server 14 that performs the anomaly analysis according to various embodiments. The server 14 may include one or more processor circuits 100 and a memory 102, such as RAM and/or ROM. The memory 102 may comprise an anomaly analysis software module 104 that includes computer instructions, which when executed by the processor circuit(s) 100, cause the processor circuit(s) 100 to perform the anomaly analysis. The behavior data may be uploaded from the various end user computer devices 12 via the network 16 to the network server 14 and stored in a computer database 106. The data of the database 106 may be stored in a primary storage of the network server 14, such as a semiconductor memory 102 of the network server, and/or in a secondary storage of the network server 14, such as magnetic, optical, and/or flash memory devices.

According to various embodiments, therefore, the present invention is directed to a computer system for detecting presence of a subject string S in a target string T of alphanumeric characters, where T has a length m. The computer system may comprise a processor circuit and a memory in communication with the processor circuit. The memory may store instructions that when executed by the processor circuit cause the processor circuit to determine a similarity score indicative of a similarity between the subject string S and the target string T. The similarity score may be computed by, for each of one or more substrings U of target string T, (i) correlating the frequency of occurrence of a set C of n unique alphanumeric characters between the subject string S and the one or more substrings U, where $n \leq m$; and (ii) normalizing the result of the correlation to produce a score for each of the one or more substrings U. Then, the similarity score indicative of the similarity between the subject string S and the target string T may be determined by selecting a greatest score from the scores for each of the one or more substrings U.

In various implementations, the step of correlating the frequency of occurrence of the set C of n unique alphanumeric characters between the subject string S and the one or more substrings U for each of one or more substrings U of target string T comprises the steps of: (i) determining a vector $\vec{u}=[u_1, u_2, \ldots, u_n]$ of n non-negative numbers, where the elements of the vector $\vec{u}$ correspond respectively to a count of the n unique alphanumeric characters in C that are present in a substring U of target string T, where the substring U has a length k where $n \leq k \leq m$; and (ii) computing a dot product, denoted r, of normalizations of $\vec{u}$ and $\vec{v}$, where $\vec{v}$ is a vector of n non-negative numbers, where the elements of the vector $\vec{v}$ correspond respectively to a count of the unique alphanumeric characters in C that are present in the subject string S. In addition, the step of normalizing the result of the correlation for each of one or more substrings U of target string T may comprise the steps of: (i) computing a dot product, denoted t, of $\vec{N}$ and $\vec{v}$, where $\vec{N}$ is a vector having n elements all being the same value; (ii) projecting a first interval of values [t,1] onto a second interval of values [0,1]; and (iii) determining the score for the substring U of string T based on a mapping of r via the projection of the first interval onto the second interval. In various embodiments, the n elements of the vector $\vec{N}$ are all 1.

Other embodiments are directed to a computer-implemented method for detecting presence of the subject string S in the target string T of alphanumeric characters, where T has a length m. The method may comprise the steps of, for each of one or more substrings U of target string T, (i) correlating, by a computer system, a frequency of occurrence of a set C of n unique alphanumeric characters between the subject string S and the one or more substrings U, where $n \leq m$; and (ii) normalizing, by the computer system, a result of the correlation to produce a score for each of the one or more substrings U. The method may further comprise the step of determining, by the computer system a similarity score indicative of the similarity between the subject string S and the target string T by selecting a greatest score from the score for each of the one or more substrings U.

Another embodiment of the present invention is directed to an apparatus that comprises a network server and a plurality of client computer devices in communication with the network server via a computer data network. The network server may comprise at least one processor circuit and at least one memory that stores instructions that are executed by the at least one processor circuit. Each of the plurality of client computer devices also may comprise at least one processor circuit and at least one memory that stores instructions executed by the at least one processor circuit. In addition, each of the plurality of client computer devices may be programmed to transmit to the network server via the computer data network user interaction data indicative of interactions by respective users of the plurality of client computer devices. In addition, the network server may be programmed to: (i) compare behavior of a selected one of the respective users of the plurality of client computer devices to collective behavior of the respective users of the plurality of client computer devices; and (ii) compute a score for the selected one of the respective users of the plurality of client computer devices that is indicative of a difference between behavior of the selected one of the respective users and the collective behavior of the respective users of the plurality of client computer devices.

According to various implementations, the network server is further programmed to calculate each respective user's level of contribution to anomaly in the behavior. In addition, each of the plurality of client computer devices may be programmed to: track user interactions with the client computer device and store the user interaction data in a log. The user interactions may comprise events such as, (i) key strokes on a keyboard of the client computer device, (ii) mouse commands using a mouse of the client computer device, (iii) installing a hardware device on the client computer device, (iv) opening a software application on the client computer device, or (v) closing the software application on the client computer device.

In addition, each of the plurality of client computer devices may be programmed to determine a confidence score indicative of whether a pattern of multiple user interactions stored in the log are indicative of an event, and, when the confidence score is greater than a threshold level, perform a trigger response for the event. The trigger response may include transmitting data indicative of the event to the network server, displaying a pop-up window on a display of the client computer device, or preventing a user of the client computer device from performing a task.

Reference throughout the specification to "various embodiments," "some embodiments," "one embodiment," "an embodiment," and the like means that a particular feature, structure, or characteristic described in connection with the embodiment is included in at least one embodiment. Thus, appearances of the phrases "in various embodiments," "in some embodiments," "in one embodiment," "in an embodiment," and the like in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/ or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A computer system for detecting presence of a subject string S in a target string T of alphanumeric characters, where T has a length m, the computer system comprising:
   a processor circuit; and
   a memory in communication with the processor circuit, wherein the memory stores instructions that when executed by the processor circuit cause the processor circuit to determine a similarity score indicative of a similarity between the subject string S and the target string T by:
      for each of one or more substrings U of target string T, correlating a frequency of occurrence of a set C of n unique alphanumeric characters between the subject string S and the one or more substrings U, where $n \leq m$;
      normalizing a result of the correlation to produce a score for each of the one or more substrings U;
      determining the similarity score indicative of the similarity between the subject string S and the target string T by selecting a greatest score from the scores for each of the one or more substrings U; and
      at least partially responsive to selecting the greatest score, triggering a response to the subject string S in the target string T.

2. The computer system of claim 1, wherein:
   correlating the frequency of occurrence of the set C of n unique alphanumeric characters between the subject string S and the one or more substrings U for each of one or more substrings U of target string T comprises:
      determining a vector $\bar{u}=[u_1, u_2, \ldots, u_i, \ldots, u_n]$ of n non-negative numbers, wherein the elements of the vector u correspond respectively to a count of the n unique alphanumeric characters in C that are present in a substring U of target string T, wherein the substring U has a length k where $n \leq k \leq m$; and
      computing a dot product, denoted r, of normalizations of $\bar{u}$ and $\bar{v}$, where $\bar{v}$ is a vector of n non-negative numbers, where the elements of the vector $\bar{v}$ correspond respectively to a count of the unique alphanumeric characters in C that are present in the subject string S; and
   normalizing the result of the correlation for each of one or more substrings U of target string T comprises:
      computing a dot product, denoted t, of $\bar{N}$ and $\bar{v}$, where $\bar{N}$ is a vector having n elements all being the same value;
      projecting a first interval of values [t, 1] onto a second interval of values [0,1]; and
      determining the score for the substring U of string T based on a mapping of r via the projection of the first interval onto the second interval.

3. The computer system of claim 2, wherein the n elements of vector $\bar{N}$ if are all 1.

4. A computer-implemented method for detecting presence of a subject string S in a target string T of alphanumeric characters, where T has a length m, the method comprising:
   for each of one or more substrings U of target string T:
      correlating, by a computer system, a frequency of occurrence of a set C of n unique alphanumeric characters between the subject string S and the one or more substrings U, where $n \leq m$;
      normalizing, by the computer system, a result of the correlation to produce a score for each of the one or more substrings U;
      determining, by the computer system, a similarity score indicative of the similarity between the subject string S and the target string T by selecting a greatest score from the score for each of the one or more substrings U;
      at least partially responsive to selecting the greatest score, triggering a response to the presence of subject string S in the target string T; and
      wherein the computer system comprises at least one computer device that comprises a processor circuit and a memory, wherein the memory stores instructions that are executed by the processor circuit.

5. The method of claim 4, wherein:
   correlating the frequency of occurrence of the set C of n unique alphanumeric characters between the subject string S and the one or more substrings U for each of one or more substrings U of target string T comprises:
      determining a vector $\bar{u}=[u_1, u_2, \ldots, u_i, \ldots, u_n]$ of n non-negative numbers, wherein the elements of the vector u correspond respectively to a count of the n unique alphanumeric characters in C that are present in a substring U of target string T, wherein the substring U has a length k where $n \leq k \leq m$; and
      computing a dot product, denoted r, of normalizations of $\bar{u}$ and $\bar{v}$, where is a vector of n non-negative numbers, where the elements of the vector $\bar{v}$ correspond respectively to a count of the unique alphanumeric characters in C that are present in the subject string S; and
   normalizing the result of the correlation for each of one or more substrings U of target string T comprises:
      computing a dot product, denoted t, of $\bar{N}$ and $\bar{v}$, where $\bar{N}$ is a vector having n elements all being the same value;
      projecting a first interval of values [t, 1] onto a second interval of values [0,1]; and
      determining the score for the substring U of string T based on a mapping of r via the projection of the first interval onto the second interval.

6. The method of claim 5, wherein the n elements of the vector N are all 1.

* * * * *